US006413046B1

United States Patent
Penn et al.

(10) Patent No.: US 6,413,046 B1
(45) Date of Patent: Jul. 2, 2002

(54) METHOD AND APPARATUS FOR CENTERING ROTOR ASSEMBLY DAMPER BEARINGS

(75) Inventors: Morris Green Penn, West Chester; Bala Corattiyil, Cincinnati, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/770,328

(22) Filed: Jan. 26, 2001

(51) Int. Cl.[7] .................... F01D 29/04; F16C 23/04; F16C 27/04
(52) U.S. Cl. .................. 416/1; 416/174.2; 384/558; 384/581; 384/202
(58) Field of Search .............. 384/99, 192, 202, 384/558, 563, 581, 215, 218; 415/110, 111, 113, 170.1, 174.2, 229

(56) References Cited

U.S. PATENT DOCUMENTS

| RE30,210 E | * | 2/1980 | Buono et al. ............... 384/581 |
| 4,313,712 A | | 2/1982 | Briggs |
| 4,375,906 A | | 3/1983 | Roberts et al. |
| 4,453,890 A | | 6/1984 | Brantley |
| 4,808,013 A | * | 2/1989 | Waddington ............ 384/558 X |
| 4,827,712 A | | 5/1989 | Coplin |
| 4,872,767 A | * | 10/1989 | Knapp .................... 384/581 X |
| 5,052,828 A | * | 10/1991 | Ciokajlo et al. ......... 384/581 X |
| 5,088,840 A | * | 2/1992 | Radtke ....................... 384/535 |
| 5,433,584 A | | 7/1995 | Amin |
| 5,603,574 A | * | 2/1997 | Ide et al. ..................... 384/117 |
| 5,974,782 A | | 11/1999 | Gerez |
| 6,002,778 A | | 12/1999 | Rossetti et al. |
| 6,073,439 A | | 6/2000 | Beaven et al. |
| 6,098,399 A | | 8/2000 | Richards et al. |
| 6,109,022 A | | 8/2000 | Allen et al. |
| 6,240,719 B1 | | 6/2001 | Vondrell et al. |

FOREIGN PATENT DOCUMENTS

GB        2 192 233 A        1/1988

* cited by examiner

*Primary Examiner*—John E. Ryznic
(74) *Attorney, Agent, or Firm*—Nathan D. Herkamp; Armstrong Teasdale LLP

(57) ABSTRACT

A rotor assembly for a gas turbine engine including a bearing centering sub-assembly that facilitates reduces radial forces transmitted to a bearing assembly is described. The bearing assembly supports a rotor shaft with a rolling element positioned radially inward from an outer race. The bearing centering sub-assembly is coupled to the outer race and includes a plurality of first springs and second springs arranged circumferentially in a row. Each first spring is positioned between adjacent second springs and coupled between the outer race and annular ring. Each second spring is coupled between a support frame and the annular ring.

20 Claims, 4 Drawing Sheets

METHOD AND APPARATUS FOR CENTERING ROTOR ASSEMBLY DAMPER BEARINGS

BACKGROUND OF THE INVENTION

This application relates generally to gas turbine engine rotor assemblies and, more particularly, to bearing assemblies for gas turbine engine rotor assemblies.

Gas turbine engines typically include a fan rotor assembly, a compressor, and a turbine. The fan rotor assembly includes a fan that includes an array of fan blades extending radially outward from a rotor shaft. The rotor shaft transfers power and rotary motion from the turbine to the compressor and the fan, and is supported longitudinally with a plurality of bearing assemblies. Bearing assemblies support the rotor shaft and typically include rolling elements located within an inner race and an outer race.

Additionally, at least some known bearing assemblies include a plurality of identical springs attached to the bearing outer race. The springs are spaced equally in a single row circumferentially around the rotor shaft to provide radial stiffness to the bearing and to center the outer race with respect to the support frame. A first end of the springs is attached to the bearing assembly outer race, and a second end of the springs is attached to a flange coupled to a support frame.

During operation, an unbalance within the engine may cause the engine rotor shaft to displace radially. The radial displacements of the shaft are transmitted to the bearing assembly. Because the springs are arranged in parallel, the deflection of each spring is the same. A parallel configuration facilitates optimizing an overall weight of the bearing assembly by utilizing a shorter axial space than other configurations. However, the parallel configuration also reduces the spring bending stresses, thus increasing fatigue life of the bearing assembly. In addition, in this stress field, a generic single row configuration would require more springs, a greater material strength, greater cross-sectional inertia, and/or an increased spring length. As a result, a cost and weight of the bearing assembly would increase.

BRIEF SUMMARY OF THE INVENTION

In an exemplary embodiment, a rotor assembly for a gas turbine engine includes a bearing centering sub-assembly that facilitates reducing radial forces transmitted to a bearing assembly. The bearing assembly supports a rotor shaft with a rolling element positioned radially inward from an outer race. The bearing centering sub-assembly is coupled to the outer race and includes a plurality of first springs and a plurality of second springs arranged in a single row that extends circumferentially around the rotor assembly rotor shaft. Each first spring is between adjacent second springs and is coupled between the outer race and an annular ring. Each second spring is coupled between the annular ring and an engine support frame.

During normal operation, radial forces induced to the support frame are minimized by a bearing damper system consisting of an oil plenum and springs. The oil plenum is formed by a radial gap between the outer race and the support frame. A stiffness of the springs determines a rotor natural frequency, whereas the oil plenum controls a frequency response or radial deflection. The springs are beams arranged circumferentially around the rotor shaft, and center the outer race with respect to the support frame to permit the oil plenum to exist.

A cross-sectional inertia, a material modulus of elasticity, a length, and a quantity of beams determines a spring stiffness. The spring intrinsic stiffness is predetermined to allow the rotor to deflect with respect to the support frame such that the oil plenum can dampen radial forces transmitted to the support frame. Because the first spring and the second spring are arranged in a dual parallel configuration, the quantity of springs is doubled while the length of the springs is approximately half that of a single row configuration having the same spring stiffness. Individual spring bending stresses are a function of length. As a result, the parallel configuration reduces bending stresses by approximately fifty percent in comparison the single row configuration. In addition, the parallel configuration also increases fatigue life in comparison the single row configuration.

During high rotor unbalance, if the outer spring deflection is significant, the outer spring may bottom the radial gap in the oil plenum. A circumferential force is created on the outer race springs, yielding the beams in bending. Because the springs are in a parallel configuration, all springs are reduced in length an equal amount, resulting in zero axial translation of the rollers on the inner race. Additionally, a small gap between each first spring and second spring closes and to function as an anti-rotation device that prevents the springs from twisting.

DETAILED DESCRIPTION OF THE INVENTION

Figure 1:
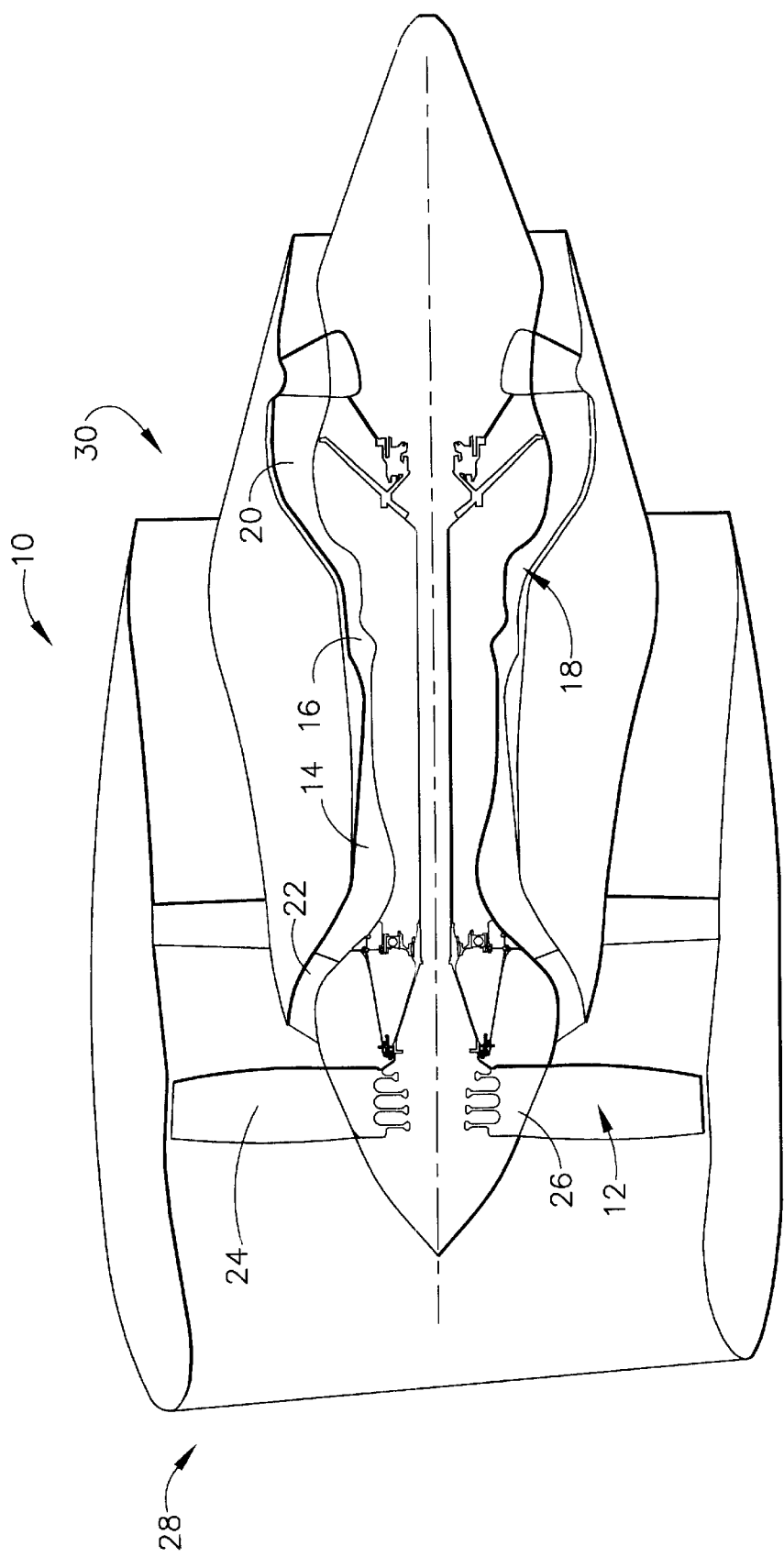
FIG. 1 is schematic illustration of a gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12.

Figure 2:
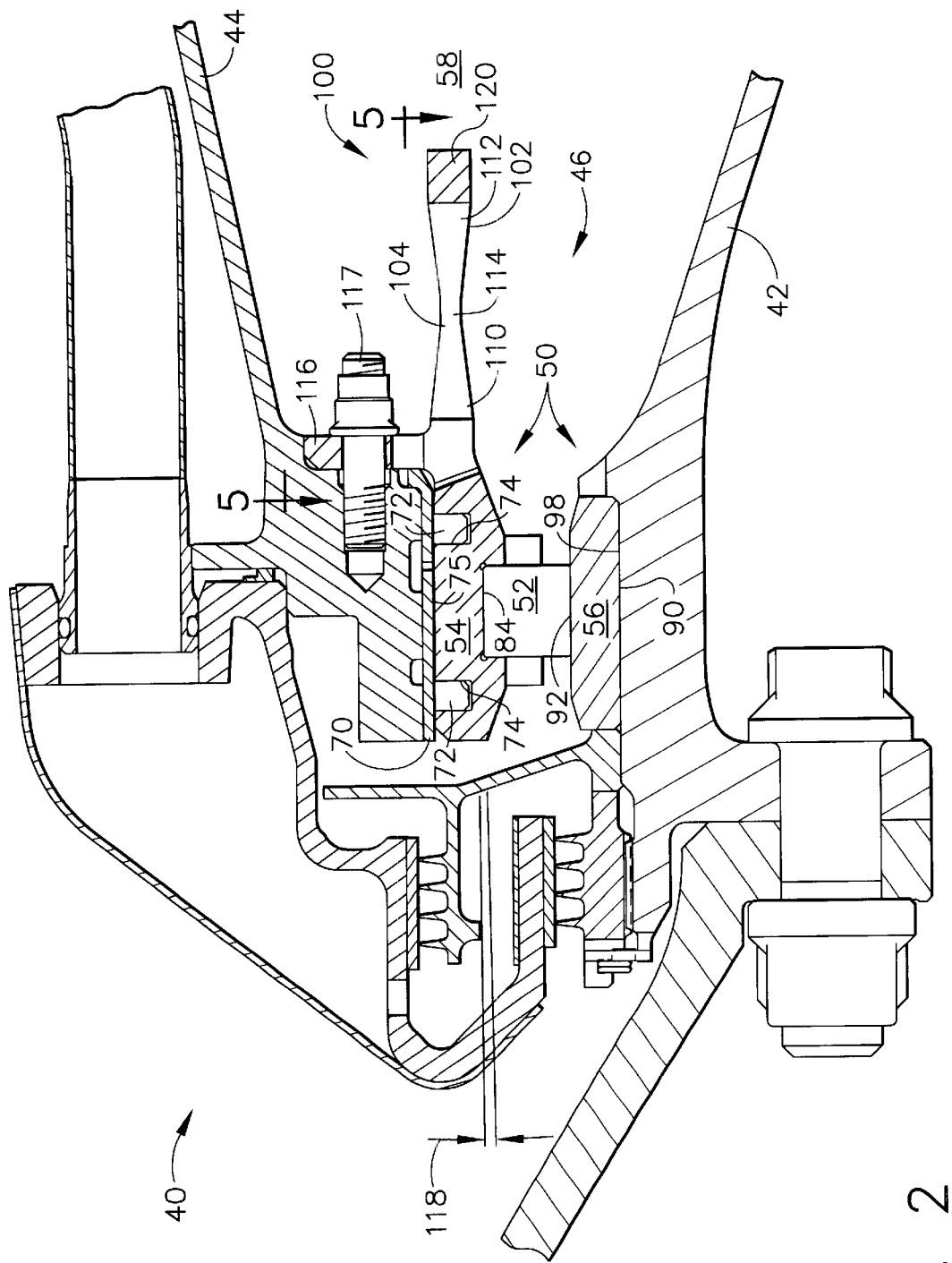
FIG. 2 is a cross-sectional view of an exemplary embodiment of a rotor assembly used in the gas turbine engine shown in FIG. 1 and including a bearing centering sub-assembly.

FIG. 2 is a cross-sectional view of an exemplary embodiment of a rotor and bearing assembly 40 that may be used with a gas turbine engine, such as engine 10 shown in FIG. 1. In one embodiment, the gas turbine engine is a GE90 available from General Electric Company, Cincinnati Ohio. Rotor and bearing assembly 40 includes rotor disc 26 (shown in FIG. 1) and a rotor shaft 42 which supports an array of fan blades 24 (shown in FIG. 1) that extend radially outward from rotor disc 26. Rotor shaft 42 is rotatably secured to a structural support frame 44 with a plurality of bearing assemblies 46 that support rotor shaft 42. In one embodiment, bearing assembly 46 is a fan thrust bearing (not shown), and is known as an engine number one bearing. In an alternative embodiment, bearing assembly 46 supports a compressor rotor (not shown).

In an exemplary embodiment, each bearing assembly 46 includes a paired race 50 and a rolling element 52. In one embodiment, bearing assembly 46 is a damper bearing. Paired race 50 includes an outer race 54 and an inner race 56 radially inward from outer race 54. Rolling element 52 is located between inner race 56 and outer race 54. Bearing assembly 46 is enclosed within a sealed annular compartment 58 radially bounded by rotor shaft 42.

Support frame 44i includes an annular support sleeve 70 and a plurality of rings 72 sized to be received within a plurality of slots 74 defined within outer race 54. Outer race 54 is positioned with a gap 75 defined between race 54 and annular support sleeve 70. A face 84 of outer race 54 receives rolling element 52 in rollable contact.

Inner race 56 includes an inner surface 90 and an inner face 92 that receives rolling element 52 in rollable contact. Inner race 56 is secured within a recess 96 in shaft 42 such that inner race inner surface 90 is adjacent an outer surface 98 of recess 96.

A bearing centering sub-assembly 100 positions bearing assembly 46 within rotor assembly 40. More specifically, bearing centering sub-assembly 100 centers outer race 54 within bearing assembly 46. Bearing centering sub-assembly 100 includes a plurality of springs 102 that extend circumferentially around engine 10. More specifically, bearing centering sub-assembly 100 includes a plurality of first springs (not shown in FIG. 2) and a plurality of second springs 104. The first springs and second springs 104 are circumferentially aligned and extend circumferentially around engine 10 in a single row (not shown in FIG. 2). More specifically, springs 102 are arranged circumferentially such that each first spring is between adjacent second springs 104.

Each bearing centering sub-assembly second spring 104 includes a forward end 110, an aft end 112, and a body 114 extending therebetween. Each second spring forward end 110 is coupled to a flange 116 with a fastener 117, such that second spring body 114 extends downstream from outer race 54. Flange 116 is substantially perpendicular to second spring body 114 and secures second spring 104 to support frame 44. More specifically, each second spring 104 is attached a radial distance 118 from rolling element 52. Each second spring aft end 112 is coupled to an annular ring 120 downstream from bearing assembly 46 and within sealed annular compartment 58.

Figure 3:
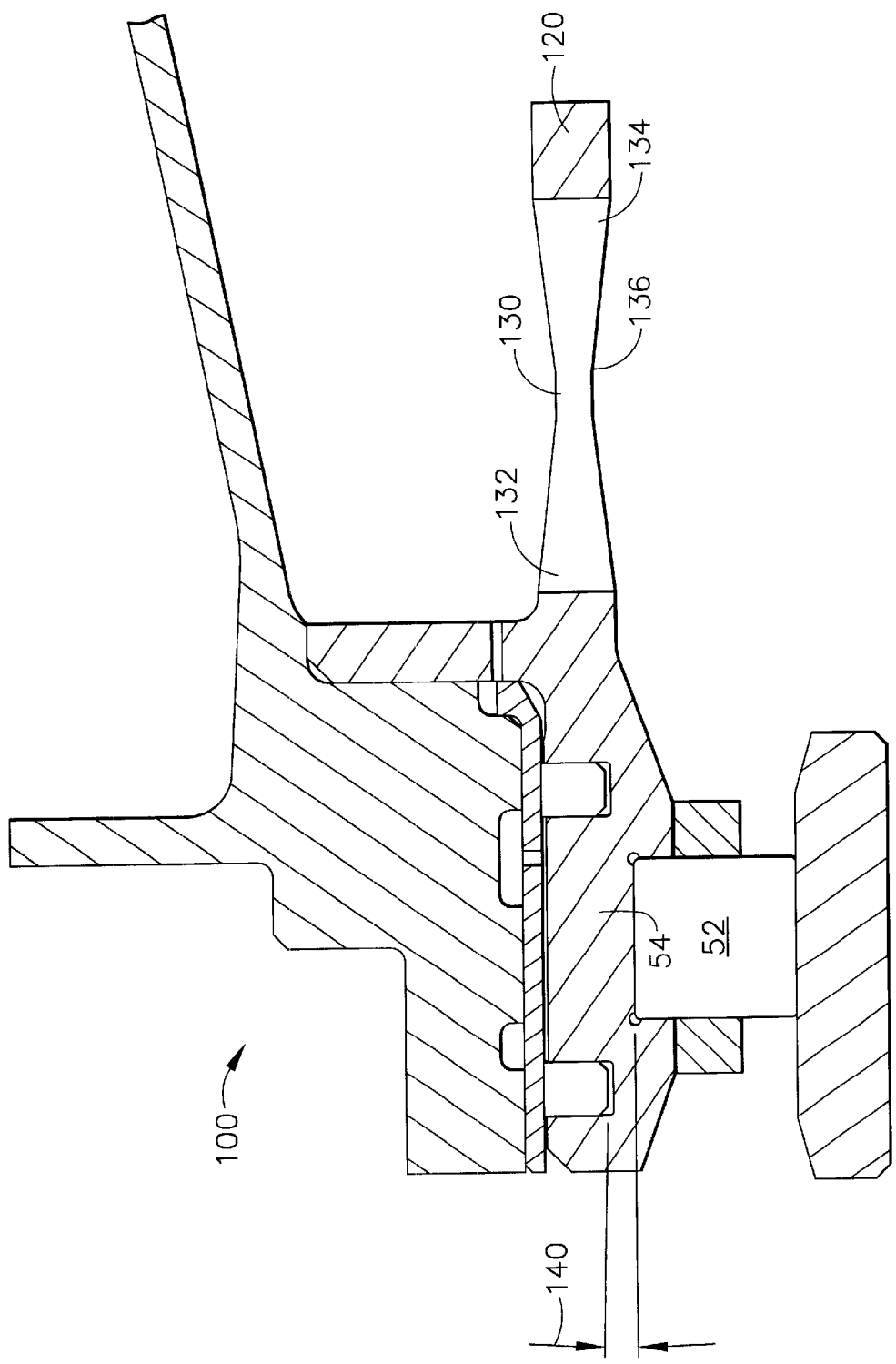
FIG. 3 is a cross-sectional view of the bearing centering sub-assembly shown in FIG. 2 taken along a different circumferential orientation.

FIG. 3 is a cross-sectional view of bearing centering sub-assembly 100 taken along a different circumferential orientation from FIG. 2. Accordingly, FIG. 3 illustrates a bearing centering sub-assembly first spring 130. Each bearing centering sub-assembly first spring 130 includes a forward end 132, an aft end 134, and a body 136 extending therebetween. Each first spring forward end 132 is coupled to outer race 54 such that first spring body 136 extends downstream from outer race 54. In one embodiment, bearing centering sub-assembly first springs 136 and second springs 104 are identical.

Each bearing centering sub-assembly first spring 130 is attached a radial distance 140 from rolling element 52. Radial distance 140 is equal to radial distance 118 (shown in FIG. 2). Each first spring aft end 134 is coupled to annular ring 120 downstream from bearing assembly 46 within sealed annular compartment 58, such that annular ring 120 extends circumferentially around rotor shaft 42 coupled to springs 130 and 104 (shown in FIG. 2). Because each first spring aft end 134 and second spring aft end 112 are each coupled to annular ring 120, bearing centering sub-assembly springs 102 are sometimes referred to as hinged.

During engine operation, in the exemplary embodiment, an unbalance of engine 10 (shown in FIGS. 1 and 2) may cause high radial forces to be applied to fan assembly 12 (shown in FIG. 1) and bearing assembly 46. More specifically, during engine operation high rotor deflection may induce radial forces into outer race 54. The radial forces are transmitted to support frame 44 through bearing centering sub-assembly 100. More specifically, as outer race 54 is forced radially outward as a result of rotor deflection, because bearing centering sub-assembly first spring 130 is attached to outer race 54, the radial movement is transmitted to bearing centering sub-assembly first spring 104.

Because bearing centering sub-assembly springs 104 and 130 are coupled with annular ring 120, the radial movement is then transmitted through annular ring 120 into bearing centering sub-assembly second spring 104 to support frame 44, and torsional forces are induced in annular ring 120. More specifically, because springs 104 and 130 are coupled with annular ring 120, when rotor shaft 42 deflects, spring 104 is radially displaced a distance (not shown) that is equal to a distance (not shown) spring 130 is radially displaced.

A sum of the amount of deflection of springs 104 and 130 is equal to a total deflection at outer race 54. A total radial stiffness of bearing centering sub-assembly 100 is given by:

$$\frac{1}{K_1} + \frac{1}{K_2} = \frac{1}{K_t} \tag{1}$$

where $K_1$, is a stiffness of spring 130, $K_2$ is a stiffness of spring 104, and $K_t$ is a total stiffness for bearing centering sub-assembly 100.

Figure 4:
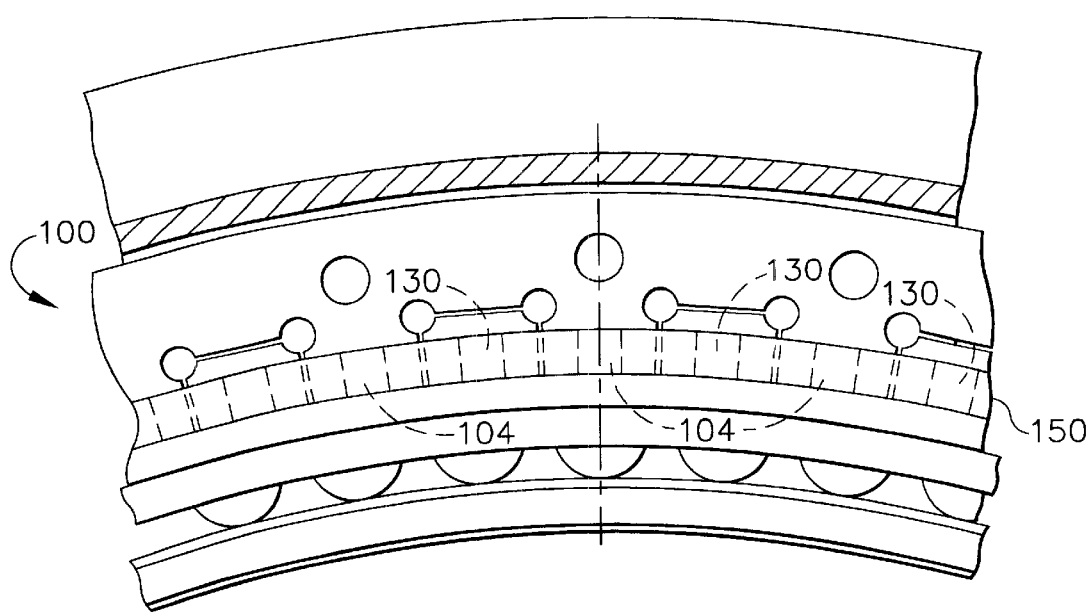
FIG. 4 is a partial end view of a bearing centering sub-assembly used with the rotor assembly shown in FIG. 2.
Figure 5:
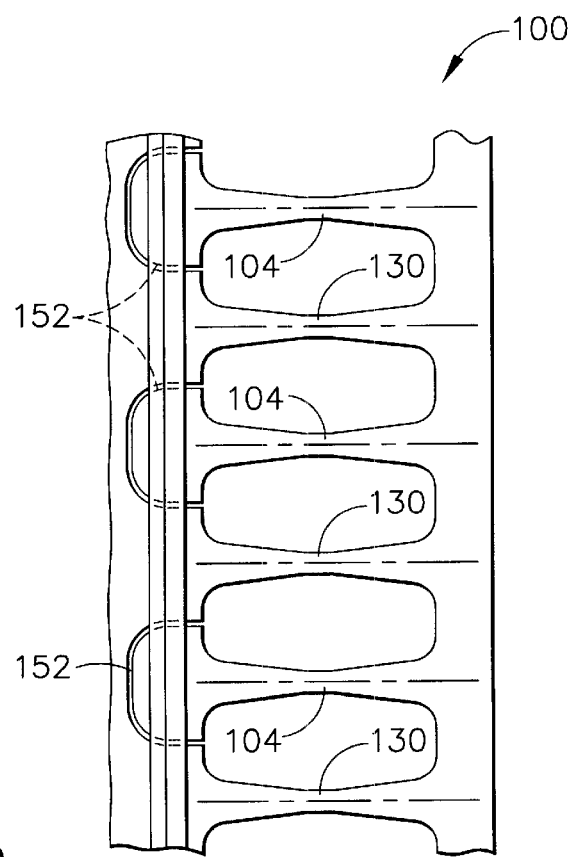
FIG. 5 is a radial view of the bearing centering sub-assembly shown in FIG. 4.

FIG. 4 is a partial end view of bearing centering sub-assembly 100. FIG. 5 is a cross-sectional view of bearing centering sub-assembly 100.Bearing centering sub-assembly first springs 130 and second springs 104 are aligned circumferentially, springs 130 and 104 extend circumferentially around engine 10 (shown in FIGS. 1 and 2) in a single row 150. More specifically, each first spring 130 is aligned circumferentially with respect to each second spring 104, such that each first spring 130 is between adjacent second springs 104, and such that a gap 152 is defined between each first spring forward end 132 and each second spring forward end 110.

As a result, when bearing centering sub-assembly 100 is not anti-rotated, both springs 104 and 130 yield to reduce in length by an equal amount when radial forces are transmitted to bearing centering sub-assembly 100. Additionally because bearing centering sub-assembly springs 102 are connected serially, springs 104 and 130 have approximately fifty percent less stress than non-serially connected springs (not shown) for a given system stiffness due to each spring's deflection being half of the total deflection.

During severe unbalances, gap 152 closes between springs 130 and 104 to react a tangential force, known as harmonic drive, to support frame 44. The reaction force prevents springs 104 and 130 from being twisted and thus, acts as an anti-rotation device for springs 104 and 130. Accordingly, there is no need for anti-rotation tabs. Additionally, as a result, a net axial translation or displacement of rolling element 52 on bearing inner race surface 92 is equal approximately zero.

As a result, bearing centering sub-assembly springs 104 and 130 may be fabricated with a shorter body length (not shown) measured between each respective forward end 110 and 132, and each respective aft end 112 and 134, than other known bearing assembly springs, while providing the same system stiffness to bearing assembly 46.

The above-described rotor assembly is cost-effective and highly reliable. The rotor assembly includes a bearing centering sub-assembly that includes a first spring and a second spring coupled with an annular ring. During operation, when the rotor shaft is displaced, the bearing centering sub-assembly springs facilitate reducing the effect of the radial forces on the bearing assembly by transmitting the radial forces to the engine support frame, resulting in zero net displacement of the rolling element. As a result, the bearing centering sub-assembly facilitates extending a useful life of the bearing assembly in a cost-effective and reliable manner.

While the invention has been described in terms of various specific embodiments, those skilled in the art will recognize that the invention can be practiced with modification within the spirit and scope of the claims.

What is claimed is:

1. A method for reducing dynamic loading of a gas turbine engine rotor assembly, the engine including a rotor shaft, a support frame, and a bearing assembly including a bearing centering sub-assembly and a damper bearing, the bearing centering sub-assembly including a plurality of first springs and a plurality of second springs, said method comprising the steps of:

supporting the rotor shaft on the support frame with the bearing assembly;

coupling the bearing centering sub-assembly first spring to the bearing assembly second spring such that the each of the first springs is circumferentially aligned in a row with respect to each of the second springs; and operating the gas turbine engine such that radial forces within the rotor shaft are transmitted through the bearing centering sub-assembly to the support frame.

2. A method in accordance with claim 1 wherein the bearing centering sub-assembly further includes an annular ring, said step of coupling the bearing centering sub-assembly further comprises the steps of:

coupling the bearing centering sub-assembly first spring between the bearing and the annular ring; and coupling the bearing centering sub-assembly second spring between the support frame and the annular ring.

3. A method in accordance with claim 1 wherein said step of coupling the bearing centering sub-assembly further comprises the steps of:

coupling the bearing centering sub-assembly first spring a first radial distance from the damper bearing; and coupling the bearing centering sub-assembly second spring a second radial distance from the damper bearing, such that the second radial distance is equal to the first radial distance.

4. A method in accordance with claim 1 wherein said step of coupling the bearing centering sub-assembly further comprises the step of coupling the bearing centering sub-assembly first spring to the bearing centering sub-assembly second spring, such that the first spring and the second spring are deflected an identical distance when subjected to radial force.

5. A method in accordance with claim 1 wherein said step of operating the gas turbine engine further comprises the step of operating the gas turbine engine such that radial forces within the rotor shaft are transmitted through the bearing centering sub-assembly first spring to the bearing centering sub-assembly second spring.

6. A bearing assembly for a gas turbine engine rotor, said bearing assembly comprising:

a damper bearing configured to support the rotor; and a bearing centering sub-assembly configured to position said bearing relative to the rotor, said bearing centering apparatus sub-assembly comprising a plurality of first springs and a plurality of second springs, said plurality of first and second springs arranged in a row.

7. A bearing assembly in accordance with claim 6 wherein said plurality of said first springs are a first radial distance from said bearing, said plurality of said second springs are a second radial distance from said bearing, said second radial distance equal said first radial distance.

8. A bearing assembly in accordance with claim 7 wherein each of said plurality of first springs connected to each of said second springs.

9. A bearing assembly in accordance with claim 7 wherein said bearing centering sub-assembly further comprises an annular ring connected to at least one of said plurality of second springs and said plurality of first springs.

10. A bearing assembly in accordance with claim 9 wherein each of said plurality of first springs attached to said annular ring, each of said plurality of second springs attached to said annular ring.

11. A bearing assembly in accordance with claim 9 wherein each of said first springs comprises a first end and a second end connected to said annular ring, each of said second springs comprises a first end and a second end connected to said annular ring.

12. A bearing assembly in accordance with claim 11 further comprising a gap defined between each of said first spring second ends and each of said second spring second ends.

13. A rotor assembly comprising:

a rotor shaft; and a bearing assembly configured to support said rotor shaft on a support frame such that dynamic loads to said support frame are reduced, said bearing assembly comprising a bearing centering sub-assembly and a damper bearing, said bearing centering sub-assembly configured to position said bearing relative to said rotor shaft, said bearing centering sub-assembly comprising a plurality of first springs and a plurality of second springs, said plurality of first springs and said plurality of second springs arranged in a row.

14. A bearing assembly in accordance with claim 13 wherein said bearing centering sub-assembly plurality of said second springs are a first radial distance from said damper bearing, said bearing centering sub-assembly plurality of said first springs are a second radial distance from said damper bearing, said first radial distance equal to said second radial distance.

15. A bearing assembly in accordance with claim 14 wherein said bearing centering sub-assembly further comprises an annular ring.

16. A bearing assembly in accordance with claim 15 wherein said bearing centering sub-assembly plurality of first springs connected to said annular ring, said plurality of second springs connected to said annular ring, such that each said first spring between adjacent said second springs.

17. A bearing assembly in accordance with claim 16 wherein each of said bearing centering sub-assembly first springs comprise a first end and a second end, said first spring first ends coupled to said damper bearing, said first spring second ends coupled to said annular ring.

18. A bearing assembly in accordance with claim 17 wherein each of said bearing centering sub-assembly second springs comprise a first end and a second end, said second spring second ends coupled to said annular ring, said second spring first ends coupled to the support frame.

19. A bearing assembly in accordance with claim 18 further comprising a gap defined between each said second spring second ends and said first spring second ends.

20. A bearing assembly in accordance with claim 14 wherein said bearing centering sub-assembly plurality of first springs and plurality of second springs deflect an identical distance when subjected to radial force.

* * * * *